United States Patent [19]

Kimura et al.

[11] Patent Number: 4,971,879
[45] Date of Patent: Nov. 20, 1990

[54] POLYMER FOR TONER, PROCESS FOR PREPARATION THEREOF AND TONER COMPOSITION

[75] Inventors: Sadao Kimura; Ryo Funato; Keiji Yoshida, all of Nagoya, Japan

[73] Assignee: Mitsubishi Rayon Company, Ltd., Tokyo, Japan

[21] Appl. No.: 349,969

[22] Filed: May 8, 1989

Related U.S. Application Data

[63] Continuation of Ser. No. 113,905, Oct. 29, 1987, abandoned.

[30] Foreign Application Priority Data

Nov. 5, 1986 [JP] Japan .................................. 61-262984

[51] Int. Cl.$^5$ .............................................. G03G 9/083
[52] U.S. Cl. .................................. 430/106.6; 430/109; 430/137
[58] Field of Search ............ 430/137, 105, 107, 106.6, 430/109

[56] References Cited

U.S. PATENT DOCUMENTS

| | | | |
|---|---|---|---|
| 4,228,273 | 10/1980 | Hughes | 528/501 |
| 4,229,569 | 10/1980 | Feldman et al. | 528/501 |
| 4,385,171 | 5/1983 | Schnabel et al. | 528/501 |
| 4,452,977 | 6/1984 | Brasz et al. | 528/500 |
| 4,591,629 | 5/1986 | El-Ghatta et al. | 528/500 |
| 4,592,990 | 6/1986 | Takagi et al. | 430/137 |
| 4,601,968 | 7/1986 | Hyosu | 430/137 |
| 4,699,976 | 10/1987 | Matsubara et al. | 528/501 |

Primary Examiner—John L. Goodrow
Attorney, Agent, or Firm—Oblon, Spivak, McClelland, Maier & Neustadt

[57] ABSTRACT

A polymer binder, in which the content of a residual monomer is not more than 200 ppm, generates a smell only to a very slight extent and provides a toner having an improved blocking resistance and resistance against a plasticizer for polyvinyl chloride. The polymer binder is prepared by maintaining a polymer suspension obtained by suspension polymerization at a temperature of not lower than the glass transition temperature of the polymer and distilling water in an amount of 5 to 60% by weight based on the amount of water present at the time of termination of the polymerization.

8 Claims, No Drawings

POLYMER FOR TONER, PROCESS FOR PREPARATION THEREOF AND TONER COMPOSITION

This is a continuation of Ser. No. 113,905, filed Oct. 29, 1987, now abandoned.

BACKGROUND OF THE INVENTION

(1) Field of the Invention

The present invention relates to a polymer binder for a dry toner to be used for the development stage in an electrophotographical process, a process for the preparation of this polymer binder, and a toner composition.

(2) Description of the Related Art

Many binder resins for dry toners have been proposed and various toner characteristics have been improved. However, large quantities of monomers are left in conventional binder resins for toners or in conventional toners, and unpleasant smells are generated in the toner-preparing process, especially at the melt-kneading steps, to worsen the working environment. Furthermore, a bad smell is generated at the copying operation to give an unpleasant feeling to the operator. There is a strong demand that these drawbacks be eliminated.

Under this background, and in order to solve this problem, the present inventors tried a method in which the polymerization product is maintained at the polymerization temperature or a higher temperature for a long time after termination of the polymerization, and a method in which, after termination of the polymerization, a solid resin obtained by dehydration and drying is treated in the molten state by an extruder or the like to remove the residual monomer. However, these methods have problems in that the amount of the residual monomer cannot be reduced to a satisfactory level, a long time is required for heating, the process becomes complicated, and the cost is increased.

SUMMARY OF THE INVENTION

It is a primary object of the present invention to provide a polymer binder for a toner having a much reduced content of a residual monomer, in which the generation of a smell is substantially controlled and which can provide a toner having an improved blocking resistance and resistance against a plasticizer for a vinyl chloride polymer.

Another object of the present invention is to provide a process in which a polymer binder for a toner having a much reduced content of a residual monomer can be prepared in a short time by a simple operation.

Still another object of the present invention is to provide a toner composition having an improved blocking resistance and resistance against a plasticizer for a vinyl chloride polymer.

In accordance with one aspect of the present invention, there is provided a polymer binder for a toner, wherein the content of a residual monomer is not more than 200 ppm.

In accordance with another aspect of the present invention, there is provided a process for the preparation of a polymer binder for a toner, which comprises maintaining a polymer suspension obtained by the suspension polymerization at a temperature of not lower than the glass transition temperature of the polymer and distilling water in an amount of 5 to 50% by weight based on the amount of water present at the time of termination of the polymerization to reduce the content of a residual monomer in the polymer to not more than 200 ppm.

In accordance with still another aspect of the present invention, there is provided a toner composition comprising 80 to 95 parts by weight of a polymer binder having a residual monomer content of not more than 200 ppm, and 5 to 20 parts by weight of a pigment.

DESCRIPTION OF THE PREFERRED EMBODIMENTS

As the polymer binder for a toner in the present invention, there can be used a known customary radical polymerization product that can be prepared by suspension polymerization. As specific examples of the monomer to be used for the production of the polymer binder, there can be mentioned aromatic vinyl compounds such as styrene, α-methylstyrene, and styrene derivatives having, as the substituent, a p-methyl group, an m-methyl group, a p-ethyl group, an m-ethyl group, a 2,4-dimethyl group, a p-butyl group, a p-hexyl group, a p-octyl group, a p-nonyl group, a p-decyl group, a p-methoxy group or a p-phenyl group; acrylic acid, methacrylic acid, acrylic acid esters and methacrylic acid esters, represented by the general formula $CH_2=CR-COOR'$ in which R stands for a hydrogen atom or a methyl group and R' stands for a methyl group, an ethyl group, an n-propyl group, an isopropyl group, an n-butyl group, an isobutyl group, an sec-butyl group, a t-butyl group, an n-pentyl group, an n-hexyl group, an n-octyl group, a 2-ethylhexyl group, an n-nonyl group, an isononyl group, a decyl group, a dodecyl group, a tridecyl group, a stearyl group, a docosyl group, a cyclohexyl group, a benzyl group, a phenyl group, a methoxyethyl group, an ethoxyethyl group, a butoxyethyl group or a phenoxyethyl group; vinyl esters such as vinyl acetate and vinyl propionate; and vinyl cyanide compounds such as acrylonitrile and methacrylonitrile. These monomers can be used singly or in the form of mixtures of two or more thereof, according to the intended object.

In this connection, a monomer mixture comprising, as main constituents, styrene and/or a derivative thereof, and an acrylic acid or methacrylic acid ester can be mentioned as a typical example.

In view of the blocking resistance and the fixing property, preferably the glass transition temperature (Tg) of the polymer for a toner according to the present invention is 50° to 100° C., more preferably 55° to 80° C.

In general, the glass transition temperature (Tg) differs to some extent according to the measurement method and conditions. In the present invention, the glass transition temperature (Tg) is defined as the point of intersection between the base line and the endothermic curve in the vicinity of Tg in a chart obtained by performing the measurement at a temperature-elevating rate of 10° C./min by a differential scanning calorimeter (hereafter referred to as "DSC").

In the present invention, the content of the residual monomer in the polymer for a toner must be not more than 200 ppm. If the content of the residual monomer exceeds 200 ppm, the blocking resistance and the resistance against a plasticizer for a vinyl chloride polymer are lowered and the problem of a generation of a smell arises.

The polymer for a toner having a residual monomer content of not more than 200 ppm is obtained by a process in which a polymer is prepared by suspension polymerization and the polymer dispersion is maintained at a temperature of not lower than Tg of the polymer to distill water in an amount of 5 to 50% by weight based on the amount of water in the dispersion. Furthermore, the intended object can be attained in a short time by blowing a large quantity of air, nitrogen or the like into the polymer dispersion or heating the dispersion at a temperature close to the boiling point of the dispersion.

In the present invention, the heating temperature for distilling water must be not lower than Tg of the obtained polymer. If this heating temperature is lower than Tg, the residual monomer contained in the polymer is confined in the polymer and it is difficult to reduce the residual monomer content to not more than 200 ppm.

In the above-mentioned process, the amount of water distilled must be at least 5% by weight based on the amount of water in the polymer dispersion. If this amount is smaller than 5% by weight, it is difficult to reduce the residual monomer content in the polymer to not more than 200 ppm. Furthermore, if the amount of distilled water exceeds 50% by weight, the effect of reducing the residual monomer content is low, and the problem of a secondary agglomeration of the polymer or an increase of the amount of cullets arises.

Until a substantial termination of the polymerization, known procedures are adopted for the suspension polymerization. More specifically, a reaction vessel equipped with a thermometer is charged with water in an amount of 1 to 10 times, preferably 2 to 4 times, the amount of the monomer, a suspension or dispersion stabilizer and, if necessary, a dispersant, and the mixture is stirred and a monomer, a polymerization initiator and, if necessary, a chain transfer agent are added to the mixture at normal temperature or an elevated temperature The temperature is elevated to a predetermined polymerization temperature, to substantially complete the polymerization. Namely, heating is conducted until the conversion is increased to at least 95%.

A known peroxide having a radical polymerization activity is used as the polymerization initiator. As specific examples, there can be mentioned di-t-butyl peroxide, t-butylcumyl peroxide, dicumyl peroxide, acetyl peroxide, isobutyryl peroxide, octanoyl peroxide, decanoyl peroxide, lauroyl peroxide, 3,5,5-trimethylhexanoyl peroxide, benzoyl peroxide, m-toluoyl peroxide, t-butyl peroxyacetate, t-butyl peroxyisobutyrate, t-butyl peroxypivalate, t-butyl peroxyneodecanoate, cumyl peroxyneodecanoate, t-butyl peroxy-2-ethylhexanoate, t-butyl peroxy-3,5,5-trimethylhexanoate, t-butyl peroxylaurate and t-butyl peroxyisopropylcarbonate. In view of the durability of the activity for the polymerization of monomer, and in order to complete the polymerization in a relatively short time, octanonyl peroxide, decanonyl peroxide, lauroyl peroxide, benzoyl peroxide and m-toluoyl peroxide are especially effectively used in the present invention. The polymerization initiator is used in an amount necessary for completing the polymerization in a relatively short time, but the polymerization initiator is generally used in an amount of 0.1 to 10 parts by weight, preferably 0.5 to 5 parts by weight, per 100 parts by weight of the monomer. In addition to the peroxide, an azo compound such as azobisisobutyronitrile or azo-bis-(2,4-dimethylvaleronitrile) can be used as the polymerization initiator in combination.

A known chain transfer agent is used according to need. For example, there can be mentioned n-octylmercaptan, n-dodecylmercaptan, t-dodecylmercaptan, and 2-ethylhexyl thioglycolate. If the chain transfer agent is left in the polymer, a bad smell is generated at the melting step. Accordingly when used, the chain transfer agent should be incorporated only in a necessary minimum amount.

A known suspension or dispersion stabilizer is used. As specific examples, there can be mentioned water-soluble resins such as polyvinyl alcohol, partially saponified polyvinyl alcohol, sodium and potassium salts of homopolymers and copolymers of acrylic acid and methacrylic acid, carboxymethyl cellulose, gelatin and starch; and little water-soluble and water-insoluble inorganic powders such as barium sulfate, calcium sulfate, barium carbonate, calcium carbonate, magnesium carbonate, and calcium phosphate. The suspension or dispersion stabilizer is used in an amount necessary for completing the polymerization and the treatment with an alkali and a solvent (hereinafter referred to as "alkali-solvent treatment") without agglomeration of the formed polymer particles. However, the stabilizer is generally used in an amount of 0.01 to 5 parts by weight, preferably 0.05 to 2 parts by weight, per 100 parts by weight of water As the dispersant to be used according to need, there can be mentioned electrolytes such as sodium chloride, potassium chloride, sodium sulfate, and potassium sulfate.

The suspension polymerization conditions depend on the kind of the monomer to be polymerized and the kind and amount of the polymerization initiator. However, the suspension polymerization is generally carried out at a temperature of 50° to 130° C., preferably 70° to 100° C., for about 1 to about 10 hours.

The toner composition of the present invention comprises 80 to 95 parts by weight of the above-mentioned polymer binder and 5 to 20 parts by weight of a pigment such as carbon black.

The toner composition may contain minor amounts of additives, for example, charge controlling agents such as nigrosine dyes, aliphatic amines, quaternary ammonium salts, oil soluble metal-containing dyes, colloidal silica and fatty acid metal salts; offset preventing aids such as low molecular weight propylene, low molecular weight polyethylene, and fluid paraffin and other waxes; and surface treating agents such as hydrophobic silica and titanium oxide. The toner composition may contain a magnetic material such as an iron powder. The amount of the magnetic material is usually 40 to 70% by weight based on the total weight of the polymer binder and the magnetic material.

The present invention will now be described in detail with reference to the following examples Note, in the examples, all of "parts" and "%" are by weight unless otherwise indicated.

EXAMPLES 1 THROUGH 3 AND COMPARATIVE EXAMPLE 1

To a mixture of 300 parts of water and partially saponified polyvinyl alcohol (Gohsenol GH-20 supplied by Nippon Synthetic Chem. Ind. Co.) were added to 79.7 parts of styrene, 20 parts of n-butyl acrylate, and 0.3 part of divinylbenzene, the mixture was stirred, and 3 parts of benzoyl peroxide was added. The temperature was elevated to 85° C. and suspension polymerization was carried out for 2 hours to complete the polymerization. The temperature was then elevated to 103° C. to distill water in an amount of 5% (Example 1), 20% (Example 2), 40% (Example 3) or 50% (Example 4), based on the amount of water in the system, as shown in Table 1. When the content of the residual monomer in the obtained polymer was measured by gas chromatography, it was found that the residual monomer content was 200, 110, 90 or 80 ppm, respectively. When an attempt was made to distill water in an amount of 60% (Comparative Example 1), secondary agglomeration was too vigorous at the midway point and a polymer for a toner was not obtained, and therefore, the operation was stopped.

To 92.5 parts of the obtained polymer were added 5 parts of carbon black (Carbon Black #30 supplied by Mitsubishi Chem. Ind. Ltd.) and 2.5 parts of a charge controlling agent (Bontron S-31 supplied by Orient Kagaku Kogyo), and the mixture was kneaded at 150° C. for about 5 minutes by a biaxial extruder The kneaded mixture was cooled and finely pulverized by a jet mill, and particles having a size of 5 to 15 μm were collected to obtain a toner.

The glass transition temperature Tg of the formed toner was measured, and the blocking resistance, the resistance against a plasticizer for a vinyl chloride polymer, and the smell generating property were determined. The results are shown in Table 1.

COMPARATIVE EXAMPLES 2 THROUGH 4

The suspension polymerization was completed in the same manner as in Examples 1 through 4, and the as-obtained polymer (Comparative Example 2), the polymer which had been maintained at 92° C. for 2 hours after completion of the polymerization (Comparative Example 3), and the polymer which had been dried at 50° C. for 20 hours and passed through an extruder at 150° C. for 5 minutes to remove the residual monomer (Comparative Example 4) were evaluated in the same manner as in Examples 1 through 4. The results are shown in Table 1.

TABLE 1

|  | Content (ppm) of residual monomer in resin | Tg (°C.) of resin | Properties of toner | | |
|---|---|---|---|---|---|
|  |  |  | Blocking resistance[1] | Resistance against plasticizer for vinyl chloride polymer[2] | Smell[3] |
| Example 1 | 200 | 65 | B | B | A |
| Example 2 | 110 | 67 | A | B | A |
| Example 3 | 90 | 68 | A | A | A |
| Example 4 | 80 | 68 | A | A | A |
| Comparative Example 1 | Operation stopped because of violent agglomeration | | | | |
| Comparative Example 2 | 2,300 | 60 | D | C | D |
| Comparative Example 3 | 1,000 | 63 | C | C | C |
| Comparative Example 4 | 700 | 63 | C | C | B |

Note
[1] Blocking resistance A: good, B: no practical disadvantage, C: practical limit, D: not practically applicable
[2] Resistance against plasticizer for vinyl chloride polymer A: practically applicable, B: some problem, C: very low
[3] Smell A: no smell, B: slight smell, C: some smell, D: extreme smell As is apparent from the foregoing description, the polymer binder for a toner according to the present invention has no smell and can be obtained in a very short time by the treatment of the process of the present invention. Moreover, when the polymer binder of the present invention is used for a toner, a high blocking resistance and a high resistance against a plasticizer for a vinyl chloride polymer can be attained.

We claim:
1. A dry toner particle, comprising:
    80 to 95 parts by weight of a polymer binder having a residual monomer content of not more than 200 ppm and 5 to 20 parts by weight of a pigment.
2. The dry toner particle according to claim 1, wherein the polymer binder has a glass transition temperature of 50° to 100° C.
3. The dry toner particle according to claim 1, wherein the polymer binder is obtained by suspension polymerization of at least one monomer selected from the group consisting of aromatic vinyl compounds, acrylic acid esters, methacrylic acid esters, vinyl esters and vinyl cyanide compounds, or a monomer mixture predominantly composed of said selected monomer.
4. The dry toner particle according to claim 1, wherein the polymer binder is obtained by suspension polymerization of a monomer mixture predominantly composed of an aromatic vinyl compound with an acrylic acid ester or a methacrylic acid ester.
5. The dry toner particle according to claim 1, wherein the polymer binder is prepared by maintaining a polymer suspension obtained by suspension polymerization at a temperature of not lower than the glass transition temperature of the polymer, and distilling water in an amount of 5 to 50% by weight based on the amount of water present at the time of termination of the polymerization to reduce the content of a residual monomer in the polymer to not more than 200 ppm.
6. The dry toner particle according to claim 1, wherein said particle contains a magnetic material in an amount of 40 to 70% by weight based on the total weight of polymer binder and magnetic material.
7. The dry toner particle of claim 6, wherein said magnetic material is iron powder.
8. The dry toner particle according to claim 1, wherein said particle further comprises a minor amount of at least one additive selected from the group consisting of charge controlling agents, off set printing aids and surface treating agents.

* * * * *